(12) United States Patent
Rattray

(10) Patent No.: US 11,452,193 B2
(45) Date of Patent: Sep. 20, 2022

(54) SYNCHRONIZABLE, LOW POWER, LOW COST, WEARABLE WIRELESS DEVICES

(71) Applicant: THE JOHNS HOPKINS UNIVERSITY, Baltimore, MD (US)

(72) Inventor: John Michael Rattray, Baltimore, MD (US)

(73) Assignee: THE JOHNS HOPKINS UNIVERSITY, Baltimore, MD (US)

(*) Notice: Subject to any disclaimer, the term of this patent is extended or adjusted under 35 U.S.C. 154(b) by 0 days.

(21) Appl. No.: 17/270,284

(22) PCT Filed: Sep. 23, 2019

(86) PCT No.: PCT/US2019/047822
§ 371 (c)(1),
(2) Date: Feb. 22, 2021

(87) PCT Pub. No.: WO2020/041657
PCT Pub. Date: Feb. 27, 2020

(65) Prior Publication Data
US 2021/0235568 A1 Jul. 29, 2021

Related U.S. Application Data

(60) Provisional application No. 62/722,354, filed on Aug. 24, 2018.

(51) Int. Cl.
*H05B 47/19* (2020.01)
*H04W 4/02* (2018.01)
(Continued)

(52) U.S. Cl.
CPC ............ *H05B 47/19* (2020.01); *H04W 4/023* (2013.01); *H04W 76/10* (2018.02); *G06F 3/0482* (2013.01); *G06F 3/04847* (2013.01)

(58) Field of Classification Search
None
See application file for complete search history.

(56) References Cited

U.S. PATENT DOCUMENTS

2017/0105096 A1* 4/2017 Olson ................... H04W 12/33
2017/0116827 A1 4/2017 Clarke-Stone et al.
(Continued)

OTHER PUBLICATIONS

International Search Report and Written Opinion in corresponding International Application No. PCT/US2019/047822 dated Oct. 31, 2019, 7 pages.
(Continued)

*Primary Examiner* — Anh Q Tran
(74) *Attorney, Agent, or Firm* — MH2 Technology Law Group LLP (57) ABSTRACT

Some embodiments present wearable devices that communicate with other like devices via wireless signals and respond to them based on criteria that the wearer controls. According to some embodiments, the wearable devices are bracelets that allow wearers to identify, primarily by way of multicolored light displays, others based on specific criteria relating to an event or specific need. These criteria are also useful for allowing the bracelets to be controlled by a single coordinator who creates an event for the wearers to opt into (e.g. the arena manager at a sports game, the emcee at a wedding, the coordinator of a meet and greet event, etc.).

20 Claims, 7 Drawing Sheets

(51) Int. Cl.
*H04W 76/10* (2018.01)
*G06F 3/0482* (2013.01)
*G06F 3/04847* (2022.01)

(56) References Cited

U.S. PATENT DOCUMENTS

2018/0049287 A1* 2/2018 Lu .......................... F21K 9/238
2018/0069955 A1   3/2018 Kim et al.

OTHER PUBLICATIONS

International Preliminary Report on Patenability dated Mar. 2, 2021 in corresponding International Application No. PCT/US2019/047822, 6 pages.

* cited by examiner

SYNCHRONIZABLE, LOW POWER, LOW COST, WEARABLE WIRELESS DEVICES

CROSS-REFERENCE TO RELATED APPLICATIONS

This application claims priority to, and the benefit of, U.S. Provisional Patent Application No. 62/722,354 entitled, "Synchronizable, Low Power, Low Cost Wearable Electronic Devices" filed Aug. 24, 2018, which is hereby incorporated by reference in its entirety.

FIELD

This disclosure relates generally to wearable electronic devices.

BACKGROUND

Group events, such as concerts, sporting events, and university orientations involve many, e.g., dozens to tens of thousands, of attendees. Such attendees may wish to have a basis for interacting with each-other, and may wish to participate in group actions relating to the event.

SUMMARY

According to various embodiments, a system for operating wearable electronic devices is disclosed. The system includes: a plurality of wearable electronic devices, each wearable electronic device comprising: a plurality of light emitters, an electronic wearable device processor communicatively coupled to the plurality of light emitters, a radio frequency transceiver communicatively coupled to the electronic wearable device processor, and electronic persistent memory communicatively coupled to the electronic wearable device processor; and user mobile device computer readable media comprising instructions that, when executed by at least one electronic processor of a respective user mobile device, cause the respective user mobile device to perform operations comprising: establishing a wireless communication channel with a respective electronic wearable device using a respective radio frequency transceiver of the respective electronic wearable device; receiving, from a respective user of the respective electronic wearable device, a respective identification of the respective electronic wearable device; receiving, from the respective user, an identification of an event; passing the identification of the event to the respective electronic wearable device, wherein the respective electronic wearable device stores the event identification in respective electronic persistent memory; retrieving, by the user mobile device, at least one information request associated with the event; displaying, to the respective user, the at least one information request associated with the event; receiving response data, from the respective user, responsive to the at least one information request; and passing the response data to the respective electronic wearable device, wherein the respective electronic wearable device stores the response data in respective persistent memory; wherein a respective electronic wearable device processor of the respective electronic wearable device is configured to perform operations comprising: detecting a proximity of a second electronic wearable device; interrogating the second electronic wearable device for event data; determining that the event data matches the event identification; interrogating the second electronic wearable device for second electronic wearable device response data; retrieving the response data from respective persistent memory; determining that a number of matches between the response data and the second electronic wearable device response data exceeds a threshold; and in response to the determining that a number of matches between the response data and the second electronic wearable device response data exceeds a threshold, causing a respective plurality of light emitters of the respective electronic wearable device to perform a match display.

Various optional features of the above embodiments include the following. Each of the wearable electronic devices may lack an audio sensor. Each wearable electronic device may include a bracelet. The coordinator mobile device computer readable media may include instructions that, when executed by at least one electronic processor of a coordinator mobile device, cause the coordinator mobile device to perform operations comprising: broadcasting an advertising message comprising the identification of the event to the plurality of electronic wearable devices; and sending a coordinator-initiated command to the plurality of electronic wearable devices, wherein electronic wearable devices of the plurality of electronic wearable devices that store the event identification in respective electronic persistent memory execute the command. The command may include an instruction to display a particular pattern on the plurality of light emitters of the plurality of electronic wearable devices that store the event identification in respective electronic persistent memory. The command may include an instruction to display a particular pattern on the plurality of light emitters of the plurality of electronic wearable devices that store both the event identification and a particular set of response data in respective electronic persistent memory. The system may include a non-wearable object comprising: a plurality of non-wearable device light emitters; an electronic non-wearable device processor communicatively coupled to the plurality of light emitters; a radio frequency transceiver communicatively coupled to the electronic non-wearable device processor; and electronic persistent memory communicatively coupled to the electronic non-wearable device processor; wherein the non-wearable device is configured to display a particular proximity pattern on the plurality of non-wearable device light emitters when in proximity to a wearable electronic device of the plurality of wearable electronic devices. The respective electronic wearable device processor of the respective electronic wearable device may be further configured to perform operations comprising: displaying a pattern particular to the respective electronic wearable device on the respective plurality of light emitters; and displaying the match display concurrently with the pattern particular to the respective electronic wearable device on the respective plurality of light emitters of the respective electronic wearable device. The system may include: a remote database communicatively coupled to the internet; and coordinator mobile device computer readable media comprising instructions that, when executed by at least one electronic processor of a coordinator mobile device, cause the coordinator mobile device to perform operations comprising: receiving the at least one information request associated with the event from a coordinator; and forwarding the at least one information request associated with the event for storage in the remote database; wherein the retrieving, by the user mobile device, the at least one information request associated with the event comprises retrieving the at least one information request associated with the event from the remote database. The user mobile device computer readable media may further include instructions that, when executed by at least one electronic processor of a respective user mobile device, cause the respective user mobile device to perform further operations comprising: detecting a coordinator mobile device advertising message comprising the identification of the event; and displaying the identification of the event in a user interface of the respective user mobile device; wherein the receiving, from the respective user, an identification of an event comprises receiving a selection of the identification of the event through the user interface.

According to various embodiments, a method of operating wearable electronic devices is disclosed. The method includes: providing a plurality of wearable electronic devices, each wearable electronic device comprising: a plurality of light emitters, an electronic wearable device processor communicatively coupled to the plurality of light emitters, a radio frequency transceiver communicatively coupled to the electronic wearable device processor, and electronic persistent memory communicatively coupled to the electronic wearable device processor; establishing, by a respective user mobile device, a wireless communication channel with a respective electronic wearable device using a respective radio frequency transceiver of the respective electronic wearable device; receiving, by the respective user mobile device, and from a respective user of the respective electronic wearable device, a respective identification of the respective electronic wearable device; receiving, by the respective user mobile device, and from the respective user, an identification of an event; passing, by the respective user mobile device, the identification of the event to the respective electronic wearable device, wherein the respective electronic wearable device stores the event identification in respective electronic persistent memory; retrieving, by the respective user mobile device, at least one information request associated with the event; displaying, by the respective user mobile device, and to the respective user, the at least one information request associated with the event; receiving, by the respective user mobile device and from the respective user, response data responsive to the at least one information request; passing, by the respective user mobile device, the response data to the respective electronic wearable device, wherein the respective electronic wearable device stores the response data in respective persistent memory; detecting, by the respective electronic wearable device, a proximity of a second electronic wearable device; interrogating, by the respective electronic wearable device, the second electronic wearable device for event data; determining, by the respective electronic wearable device, that the event data matches the event identification; interrogating, by the respective electronic wearable device, the second electronic wearable device for second electronic wearable device response data; retrieving, by the respective electronic wearable device, the response data from respective persistent memory; determining, by the respective electronic wearable device, that a number of matches between the response data and the second electronic wearable device response data exceeds a threshold; and by the respective electronic wearable device, and in response to the determining that a number of matches between the response data and the second electronic wearable device response data exceeds a threshold, causing a respective plurality of light emitters of the respective electronic wearable device to perform a match display.

Various optional features of the above embodiments include the following. Each of the wearable electronic devices may lack an audio sensor. Each wearable electronic device may include a bracelet. The method may include providing coordinator mobile device computer readable media comprising instructions that, when executed by at least one electronic processor of a coordinator mobile device, cause the coordinator mobile device to perform operations comprising: broadcasting an advertising message comprising the identification of the event to the plurality of electronic wearable devices; and sending a coordinator-initiated command to the plurality of electronic wearable devices, wherein electronic wearable devices of the plurality of electronic wearable devices that store the event identification in respective electronic persistent memory execute the command. The command may include an instruction to display a particular pattern on the plurality of light emitters of the plurality of electronic wearable devices that store the event identification in respective electronic persistent memory. The command may include an instruction to display a particular pattern on the plurality of light emitters of the plurality of electronic wearable devices that store both the event identification and a particular set of response data in respective electronic persistent memory. The method may include providing a non-wearable object comprising: a plurality of non-wearable device light emitters, an electronic non-wearable device processor communicatively coupled to the plurality of light emitters, a radio frequency transceiver communicatively coupled to the electronic non-wearable device processor, and electronic persistent memory communicatively coupled to the electronic non-wearable device processor; wherein the non-wearable device is configured to display a particular proximity pattern on the plurality of non-wearable device light emitters when in proximity to a wearable electronic device of the plurality of wearable electronic devices. The respective electronic wearable device processor of the respective electronic wearable device may be further configured to perform operations comprising: displaying a pattern particular to the respective electronic wearable device on the respective plurality of light emitters; and displaying the match display concurrently with the pattern particular to the respective electronic wearable device on the respective plurality of light emitters of the respective electronic wearable device. The method may include: receiving, by a coordinator mobile device, the at least one information request associated with the event from a coordinator; and forwarding, by a coordinator mobile device, the at least one information request associated with the event for storage in the remote database; wherein the retrieving, by the user mobile device, the at least one information request associated with the event comprises retrieving the at least one information request associated with the event from a remote database communicatively coupled to the internet. The method may include: detecting, by the respective user mobile device, a coordinator mobile device advertising message comprising the identification of the event; and displaying the identification of the event in a user interface of the respective user mobile device; wherein the receiving, by the respective user mobile device, and from the respective user, an identification of an event comprises receiving a selection of the identification of the event through the user interface.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Some embodiments present wearable devices that communicate with other like devices via wireless signals and respond to them based on criteria that the wearer controls. In some embodiments, these devices are used in a mesh network to allow for the synchronization of like devices in a localized area.

Some embodiments enhance a sense of connection between people by alerting the wearers of these devices to shared features between them and consenting other wearers. These devices display information to the wearer and the public by means of individually addressable multicolored LEDs.

According to some embodiments, the wearable devices are bracelets that allow wearers to identify, primarily by way of multicolored light displays, others based on specific criteria relating to an event or specific need. These criteria are also useful for allowing the bracelets to be controlled by a single coordinator who creates an event for the wearers to opt into (e.g. the arena manager at a sports game, the emcee at a wedding, the coordinator of a meet and greet event, etc.).

According to some embodiments, the wearable devices can be securely controlled by the wearer by means of a user smartphone application. The user application allows the wearer to change parameters of the device that include, but are not limited to, the information broadcasted, the filters used in reacting to information from other like devices, and the colors and display patterns of the device.

During events that are coordinated by one entity such as a university new student orientation, a coordinator individual has the ability to send master commands to all wearable devices simultaneously to alert the wearers of significant events occurring as well as to facilitate the grouping of the wearers based on the information present on their devices. The coordinator may install a coordinator application on his or her mobile device to issue such commands. In the example of a university student orientation where the students have indicated their adviser in the list of information they provide to the device, the coordinator can use his or her mobile device with the installed coordinator application to command the wearable devices to display a color that represents the wearer's adviser to help students locate their adviser as well as other students with the same adviser.

Other applications for some embodiments include social events such as concerts and sporting events. In the case of a spectator sport, an example of this could be in the event of a goal scored, the devices synchronously display light patterns controlled by the coordinator of the event and display the colors of the scoring team on the devices belonging to wearers indicating that they support that team. In the case of a concert, the performer could ahead of time plan patterns to be displayed on all the devices simultaneously and in sync with their music and their light show on stage.

The wearable devices according to some embodiments can be manufactured for less than $20, are easily scalable for multiple events, and use a minimal number of components. Some such devices may include: a microcontroller (which may include or be coupled to an included wireless interface), individually addressable RGB LEDs, a rechargeable LiPo battery, a custom designed printed circuit board, software running on the wearable device, and software running on user smartphones. Embodiment also include software running on a coordinator's smart phone.

Additionally, or alternatively, some embodiments include a non-wearable object, such as a flying disc, outfitted similarly to the wearable devices. According to some embodiments, such non-wearable objects (e.g., flying discs) may include: a microcontroller (which may include or be coupled to an included wireless interface), individually addressable RGB LEDs, a rechargeable LiPo battery, a custom designed printed circuit board, software running on the wearable device, and software running on user smartphones or a coordinator smartphone.

The wearable devices are useful in the context of a coordinated event, though they continue to have use outside of a coordinated event to display color light patterns for the wearers pleasure. Events are created by a coordinator who decides a priori a set of one or more information requests, which may be in the form of question(s), that both allow the wearable devices to identify other wearable devices with similar responses. For example, the wearable devices may store user answers to multiple information requests, and detect when another proximate wearable device stores one or more answers (e.g., 30%, 50%, 75%, etc.) in common. As a specific example, each wearable device may store answers to fifteen information requests and trigger a proximity display whenever another wearable device is proximate and has at least four responses to the information requests in common. Further, the coordinator may initiate targeted effects (e.g. after a goal, only initiating a light display on wearable devices belonging to the supporting team's fans). This service provided to the coordinator can be accessed via internet accessible device (e.g., smartphone) and may be for setting the event setup information such as the information request, maximum number of participants, etc. This information is then stored in a remote database communicatively connected to the internet along with a uniquely generated event identification.

According to some embodiments, each wearable device continually displays a unique LED pattern associated with its user when operational. The unique pattern may be any combination of colors, flashing durations, flashing sequences, etc. In addition, when a first wearable device is proximate to a second wearable device with a threshold number of information request responses in common, the first wearable device may display the unique pattern of the second wearable device in addition to its existing unique pattern. Likewise, the second wearable device may display the unique pattern of the first wearable device in addition to its own existing unique pattern.

According to some embodiments, when a third wearable device is proximate to both the first and second wearable devices, as described in the paragraph above, and also has a threshold number of information request responses in common, it may display its own unique pattern, as well as the unique patterns of the first and second wearable devices. Similarly, the first wearable device may display the unique patterns of the second and third wearable devices in addition to its own in this situation, and the second wearable device may display the unique patterns of the first and third wearable devices in addition to its own pattern. Thus, the wearable devices are capable of recognizing and alerting a user to more than one other wearable device at a time. According to some embodiments, the wearable device queues all proximate wearable devices with a threshold number of common responses and displays three or less colors representing the first three or less wearable devices in the queue for a time period (e.g., five seconds), then displays the next three in the queue or cycles around to the beginning if less than three remain. The wearable device continues to do this until out of range or the user disables the advertising function.

According to some embodiments, non-wearable devices, such as flying discs, may lack a unique LED pattern that is continuously displayed. Instead, such non-wearable devices may display the particular pattern of any user that is proximate to the non-wearable device. For flying disc embodiments, for example, the disc may display the unique pattern of a user that catches it in flight.

According to some embodiments, either of both of the wearable and non-wearable devices harness environmental energy to supplement their battery life. For example, flying discs and bracelets (or other wearable and non-wearable devices) may harness the object's (or wearer's) kinetic energy and provide such energy to recharge their respective batteries. Alternately, or in addition, such devices may harvest solar energy using solar cells for recharging respective batteries. Given the low power budget of these devices, the amount of energy harvested is expected to extend battery life by as much as 40% over the course of a single use.

Figure 1:
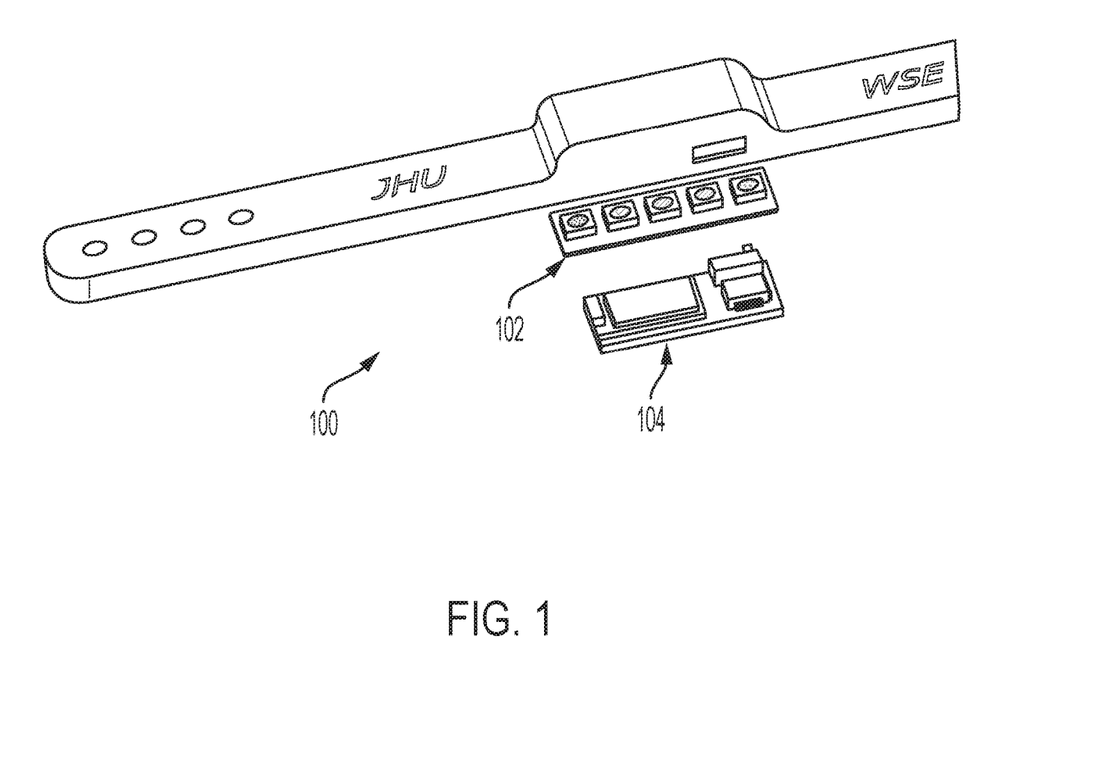
FIG. 1 illustrates an exploded view of an example embodiment of a wearable device in bracelet form in accordance with various embodiments.

FIG. 1 illustrates an exploded view of an example embodiment of a wearable device 100 in bracelet form in accordance with various embodiments. As shown, the bracelet includes a plurality of LEDs 102, which may be individually addressable. Each LED 102 may be capable of emitting a variety of frequencies of visible electromagnetic radiation, i.e., light. Further, LEDs 102 are communicatively coupled to microcontroller 104. Microcontroller 104 controls the color of the LEDs, as well as patterns of displays of the LEDs, e.g., flashing in sequence, scrolling, blinking, etc. The depicted wearable device 100 also includes a rechargeable battery supplying power to the microcontroller and LEDs. Microcontroller 104 may include, or be coupled to one or more included, wireless interfaces (e.g., Bluetooth and/or Nordic nRF52188). According to some embodiments, the Bluetooth wireless interface may be used for communications between a wearable device and a user smart phone executing a user application, and the Nordic nRF52188 may be for communications between wearable devices.

According to some embodiments, the range at which the wearable devices wirelessly communicate may be limited to an approximately 15-30 foot radius. Limiting the range to this narrow radius can increase the ease with which, in a crowded environment, a user can find a wearable device with a corresponding proximity display (due to sufficient similarity among their information request responses) because the user can be sure their match is in their localized region. However, some embodiments permit users to change the range of their wearable device's wireless communications (e.g., between a couple feet to –100 m). In such embodiments, the users may adjust their respective wearable devices' ranges using their smartphone apps.

The hardware used in the wearable devices can also be embedded in common objects such as balls, flying discs, etc that, when interacted with, will change the wearers display or the display of the object. An example of this is a flying disc with one of these devices embedded inside of it and an led running the perimeter of the flying disc. One mode of the flying disc is the changing of color each time it is caught by a new participant wearing a bracelet. Another is the flying disc changing color to represent the catching participant's response to a selected question. Still another mode could involve participants gathering into teams and playing games such as ultimate flying disc or other throwing/catching games where for an allotted time the flying disc records the number of passes for each team and at the end of the allotted time displays the color of the team with the most passes.

Note that some embodiments omit any type of audio sensor from the wearable device, such as a microphone. An advantage of such omission is that such devices cannot be hacked to gather audio of the ambient environment by a nefarious actor (e.g., hacker). Similarly, some embodiments omit any type of image sensor, such as a camera.

Figure 2:
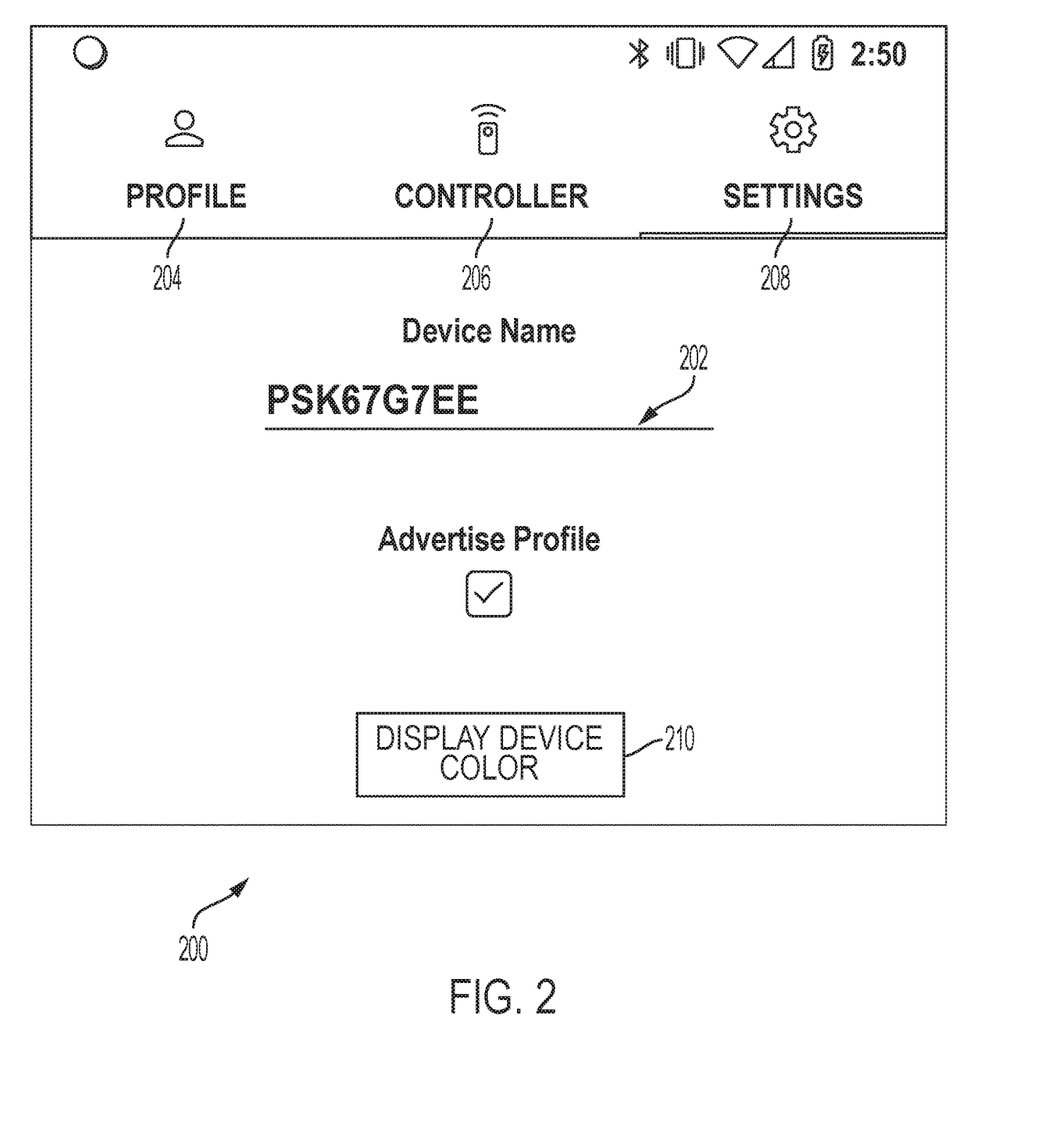
FIG. 2 depicts a portion of an example device name entry screen of a user application executing on a user mobile device according to various embodiments.

FIG. 2 depicts a portion of an example device name entry screen 200 of a user application executing on a user mobile device according to various embodiments.

Device name entry screen 200 allows the user to change and update device settings such as the device name as well as broadcasting visibility. That is, device name entry screen 200 may be used to enter or change the device's name, e.g., during a set-up procedure. Accordingly, device name entry screen 200 includes field 202 into which a user may enter a name for the device.

Device name entry screen 200 also includes advertise profile check box 204, which, when checked, configures the device to advertise its profile to other such devices. Unchecking the advertise profile check box 204 removes the participant from interacting with other participants, but does not remove the participant from receiving commands from the coordinator. According to some embodiments, only unsubscribing from the event allows for the participant to be uninfluenced by other participants' wearable devices and commands from the coordinator.

Each wearable device is given an identifying color that is displayed on both the wearable device itself as well as any wearable devices in a localized area with which there are more than a certain number of questions in common. To observe the wearable device's device color outside of this occurrence the wearer can momentarily display it by pressing display device color button 210.

Device name entry screen 200, along with other device screens, includes a header that itself incudes buttons that invoke various functionalities. As shown, device name entry screen 200 includes profile button 204, controller button 206, and settings button 208.

Figure 3:
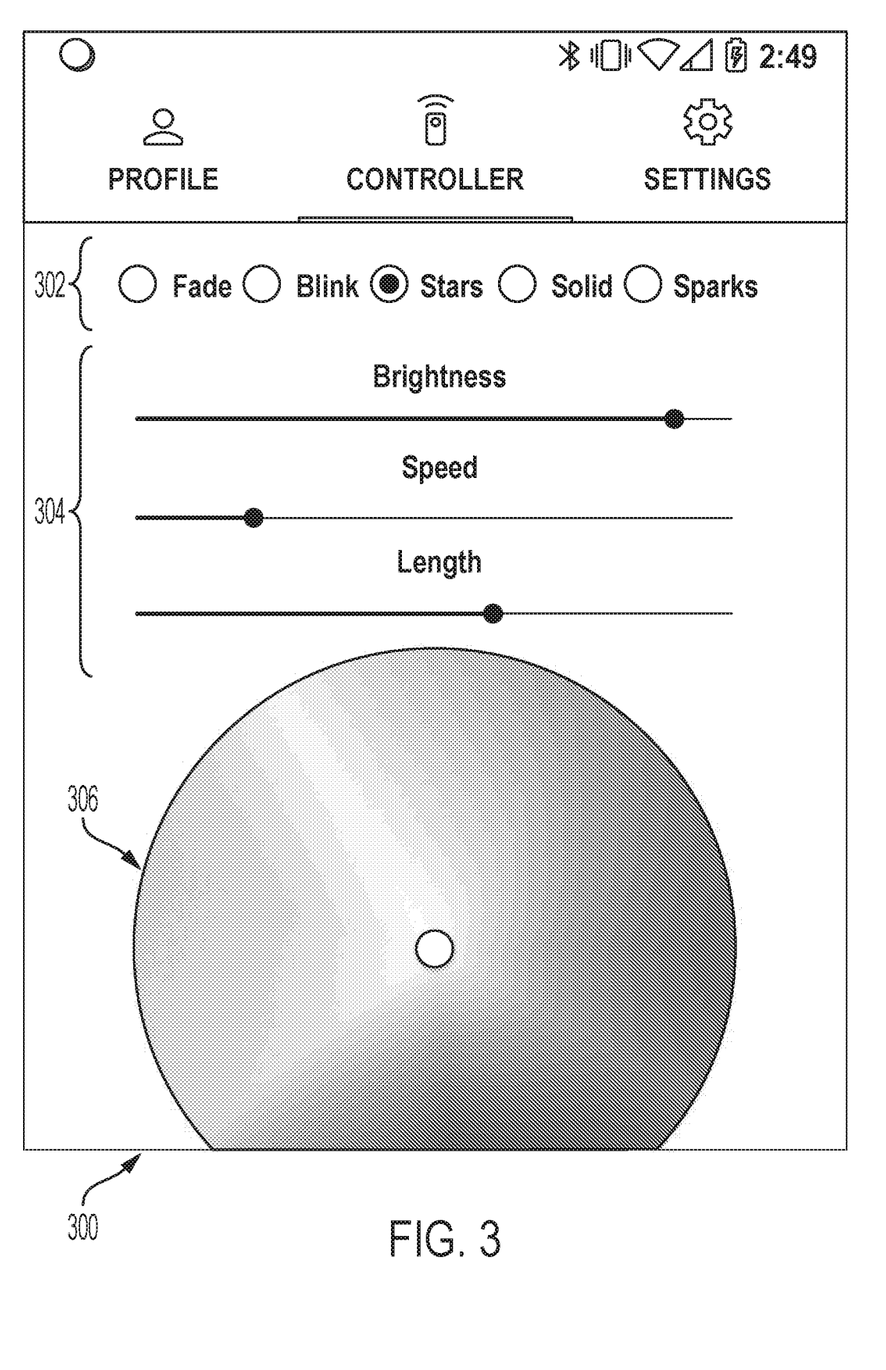
FIG. 3 depicts a portion of an example display setting screen of a user application executing on a user mobile device according to various embodiments.

FIG. 3 depicts a portion of an example display setting screen 300 of a user application executing on a user mobile device according to various embodiments. Display setting screen 300 allows the user to customize the colors and light displays that are visible when the wearable device is not in communication with other wearable devices or being controlled by coordinator commands. As shown, display setting screen 300 includes radio buttons 302 for selecting among various display options, including fade, blink, stars, solid, and sparks. Display setting screen 300 further includes sliders 304 for display brightness, speed, and length. Display setting screen further includes color wheel 306, for selecting among various colors.

Figure 4:
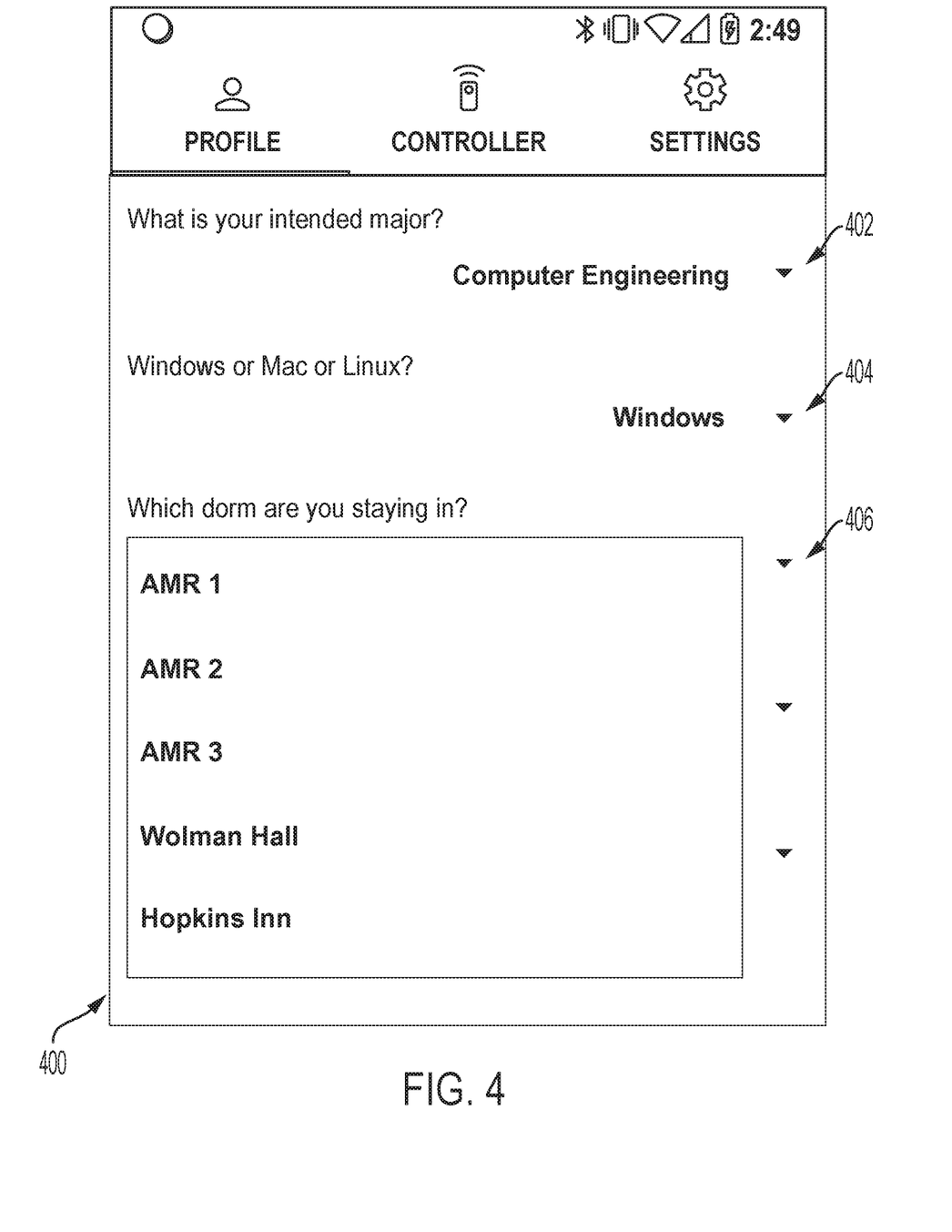
FIG. 4 depicts a portion of an example information request screen of a user application executing on a user mobile device according to various embodiments.

FIG. 4 depicts a portion of an example information request screen 400 of a user application executing on a user mobile device according to various embodiments. Information request screen 400 may be used to enter personal or other information relating to the user. In particular, the information requests may in the form of questions, to which a user may select an answer from a preselected list of answers, or, alternatively, provide a freeform answer, for example. Questions for the example of a university student orientation environment may include, by way of non-limiting example, the following. "What dorm are you assigned to?" "Who is your advisor?" "How many languages do you speak?" "What is your major" "How many siblings do you have?" According to some embodiments, uniformity is important for the wearable devices to be able to determine which others have common responses. For this reason responses to questions may be finite and participants may be given the option to choose the response that is most applicable to them. As depicted in FIG. 4, information request screen 400 includes major drop-down menu 402 for selecting a major, operating system drop-down menu 404 for selecting an operating system, and dorm selection screen 406 for selecting a dorm. Other selection possibilities are possible.

Figure 5:
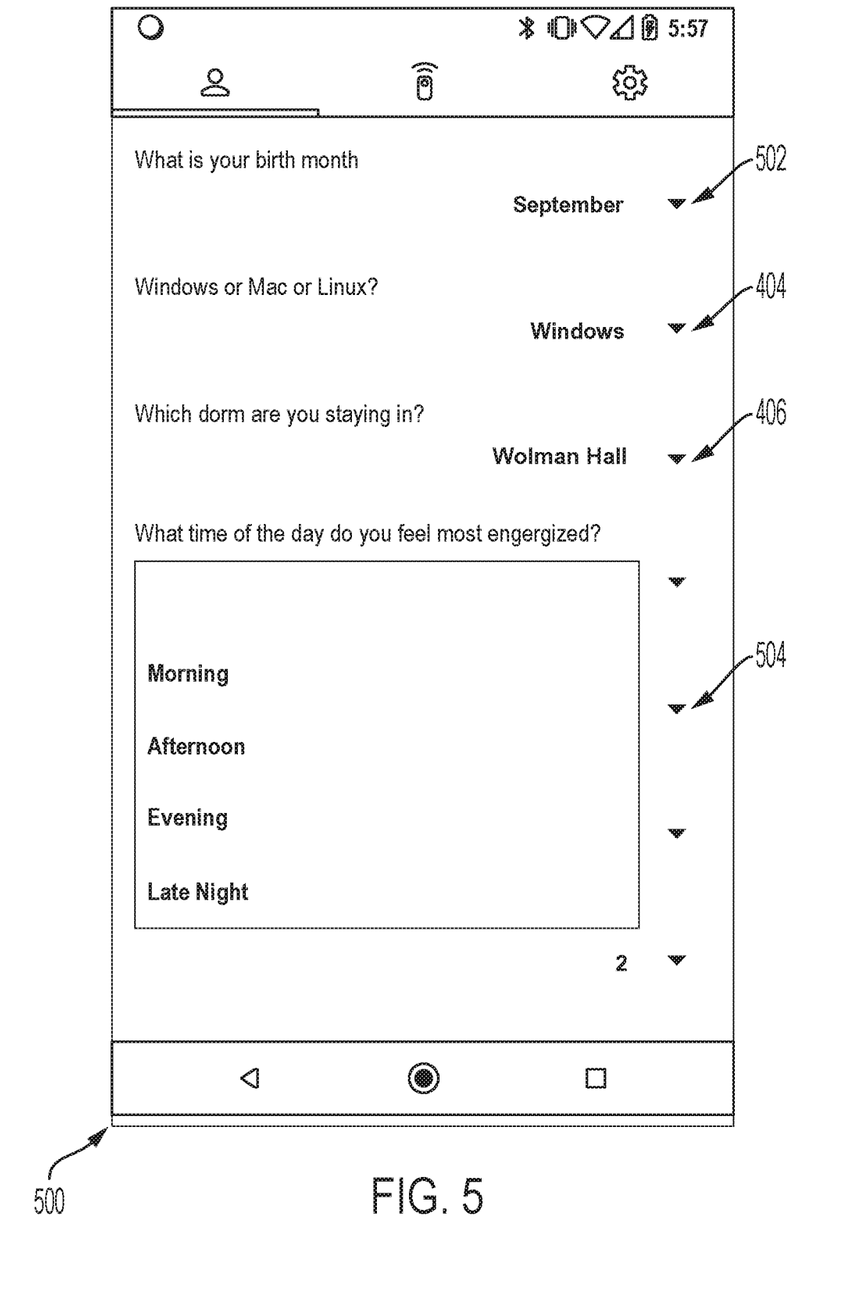
FIG. 5 depicts a portion of another example information request screen of a user application executing on a user mobile device according to various embodiments.

FIG. 5 depicts a portion of another example information request screen 500 of a user application executing on a user mobile device according to various embodiments. As shown, information request screen 500 includes the following questions. "What is your birth month?" "Windows or Mac or Linux?" "Which dorm are you staying in?" "What time of day do you feel most energized?" Information request screen has corresponding respective drop-down menus, including birth month drop-down menu 502 for selecting a birth month, operating system drop-down menu 404 for selecting an operating system, dorm selection screen 406 for selecting a dorm, and preferred time-of-day drop-down menu 504 for selecting a preferred time of day.

Upon connecting to their wearable device, the participant may be offered the options of (1) supplying responses to the questions provided for the event (2) changing the light displays visible on the wearable device when it is idle and (3) changing parameters on the device itself.

Figure 6:
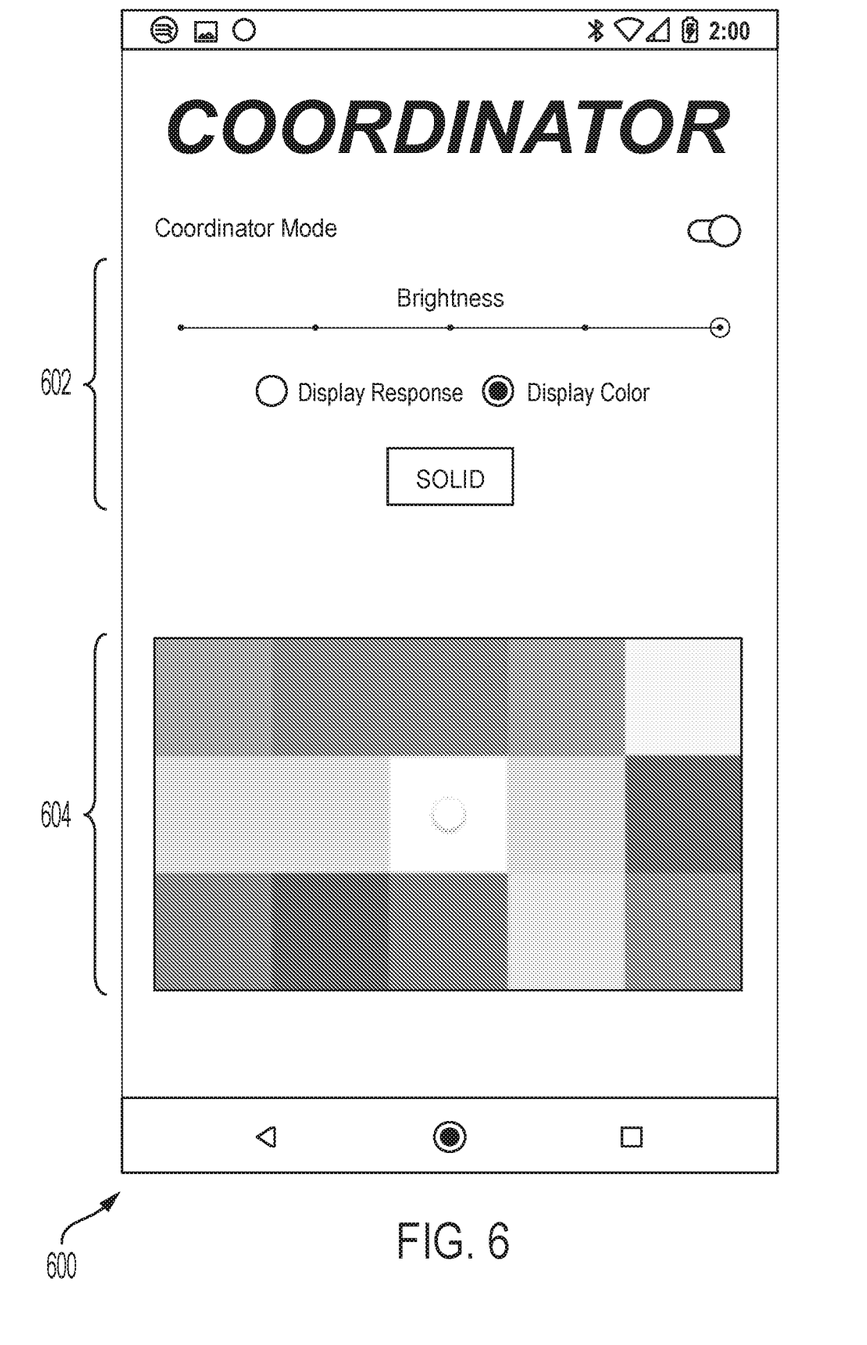
FIG. 6 depicts a portion of an example screen of a coordinator application executing on a user mobile device according to various embodiments.

FIG. 6 depicts a portion of an example coordinator screen 600 of a coordinator application executing on a user mobile device according to various embodiments. In general, the coordinator of an event that participants have opted into has the control to facilitate the interaction between participants by commanding all or a selection of wearable devices to display color patterns chosen by the coordinator or representing responses to questions associated with the event. Thus, coordinator screen 600 includes radio buttons 602 for selecting display color or display responses. For example, in the event of a university student orientation the coordinator can structure a percentage of the time such that for a few minutes each wearable device displays a color that represents the choice made by the participant for a question (e.g. all students selecting Freshman Hall as their dorm hall will display blue, all students selecting University Hall display pink, etc.). Participants can then congregate together with others who responded similarly or differently depending on the question.

The coordinator also has the ability to command all wearable devices to display one color simultaneously using radio buttons 602 and color selector 604. For example, at an event where an object is dramatically lit up, the coordinator could turn off all the wearable devices during the countdown to the lighting event and then at the touch of a button have all the wearable devices turn on displaying the same color in sync with the turning on of all the lights to illuminate the object.

The range which with the coordinator can control wearable devices is 50-100 meters as specified by the Bluetooth standard. To accommodate events where participants are distributed beyond this range the wearable devices can themselves be used to repeat the coordinator signal and increase the coordinator's effective range. Such repeater functionality may convey coordinator commands and/or be used to implement the proximity displays disclosed herein. For example, if Wearable Device A is within range of Wearable Device B but not Wearable Device C, if Wearable Device B and Wearable Device C are within range, if Wearable Device A and Wearable Device C have sufficient similarity among their stored information request responses, and if Wearable Device B has repeater functionality, then Wearable Device A and Wearable Device C may initiate proximity displays using signals repeated by Wearable Device B.

Alternately, the same devices used in the wearable devices can be purposed as dedicated repeaters and placed inconspicuously throughout the environment. This latter approach is not reliant upon participants to be in the areas that would best propagate the signal throughout the environment.

Figure 7:
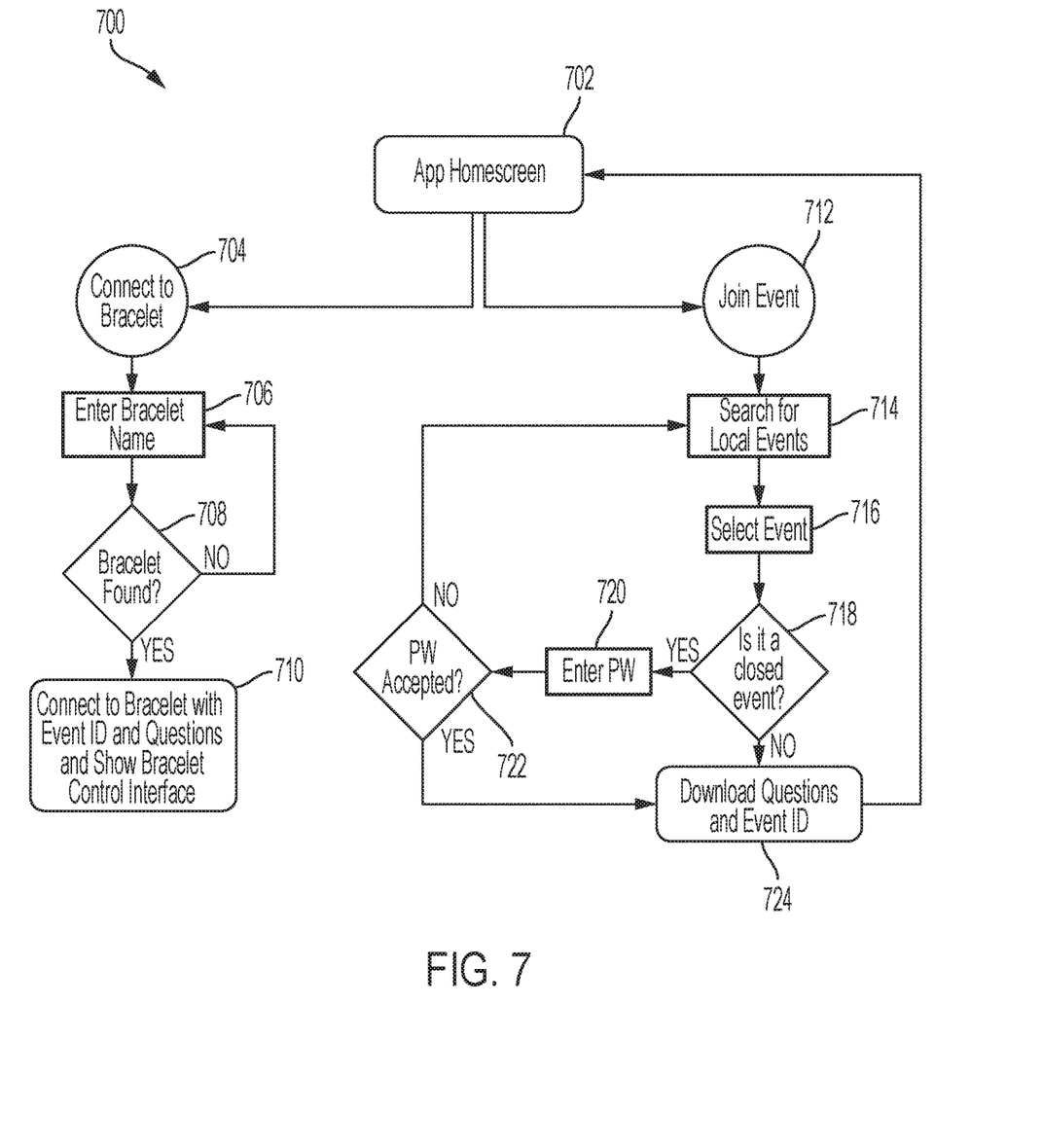
FIG. 7 is a flowchart of processes performed at least on part by a user application executing on a user mobile device according to various embodiments.

FIG. 7 is a flowchart of processes performed at least on part by a user application executing on a user mobile device according to various embodiments. The processes include a set-up procedure 704 depicted on the left-hand-side of FIG. 7, and an event joining procedure 712 as depicted on the right-hand-side of FIG. 7.

Per set-up procedure 704, from the home screen of the user application, the user may connect to the user's wearable device, e.g., by activating a button on the user application. At 706, the user enters the name of the device, which may be printed on the device or on an accompanying slip of paper. The user may utilize a screen such as device name entry screen 200 of FIG. 2 to that end. At 708, the user application determines whether the wearable device has been found by the user's mobile device executing the user application. If not, then control returns to block 706. If so, then control passes to block 710. At 710, the user application connects to the wearable device. A corresponding screen may display an event identification, questions for the user (e.g., as shown and described above in reference to FIGS. 4 and 5) and a link to a control interface (e.g., as shown and described in reference to FIG. 3).

Per event joining procedure 712, the wearable devices may be given to participants and may be initially associated with no event at the time of receipt. To connect the wearable devices to a particular event, the user application detects which events are occurring in a nearby radius. The application may present a list of such events to the user at 714. The user may select a listed event at 716, and the application proceeds to connect to the user-selected event. Before connecting, however, the user application determines whether the event is open or closed at 718. If the event is closed, then control passes to block 720, where the user application prompts the user for a password. If the password is incorrect, the control reverts to block 714. Otherwise, if the password is correct, then control passes to block 724. If the event is open, then control passes from block 718 to block 724. At 724, the wearable device connects to the event. Once connected to the event, the mobile device pulls from a remote database the event identification and the information requests associated with the event and stores them locally on the wearable device. Now when the user connects to their wearable device, it will be these questions and event identification present on the device Details of the communications, according to various embodiments, between the wearable devices, between the wearable devices and the user application, and between the wearable devices and the coordinator application are set forth presently.

For communications between the wearable devices, the data emitted by a sending wearable device may be encapsulated into two advertising packets. These two packets may be in accordance with the General Advertising Protocol (GAP) of the Bluetooth Low Energy standard. Thus, the two packets may be both 31 bytes long, and the second packet may be emitted only upon request by a device receiving the first 31 byte packet.

The first packet of data (Advertising Packet) that is sent from a wearable device to a wearable device may contain an 8-byte long device name that can be changed by the owner for identification purposes as well as a number of bytes used to indicate that this device can connect to a peripheral (smartphone, etc.) and establish a peer-to-peer connection to transfer more data.

The second packet of data (Scan Response Packet) may contain unique identifiers for this system followed by a unique event ID and information representing the question responses the user chose. The data layout may be as follows:

| Byte # | 1 | 2 | 3 | 4 | 5-31 |
|---|---|---|---|---|---|
| Description | Misc. | System ID | System ID | Event ID | Response |
| Example | 0 × FF | 0 × 44 | 0 × AB | 0 × 09 | {0 × 01, 0 × 14, . . . } |

According to some embodiments, all wearable devices may request this second Scan Response Packet and, upon receipt, check that bytes two and three are the identifiers it is expecting for another device associated with that system. Additionally, it also compares the fourth byte to ensure that the device in question and itself are participating in the same event. Lastly, the wearable device compares all nonzero response bytes to its own in order and, if a certain threshold of matching responses is met, the device will initiate the display sequence alerting the user to synergy with the second device.

For communications between the wearable device and the user application executing on a mobile device of the user, the data sent between a wearable device and the user application may be used primarily to update the parameters on the wearable device, such as the brightness, display color, display speed, light pattern, responses to questions, intent to advertise, and name. A mobile device such as a smartphone using the user application according to some embodiments may locate a device by name and initiate a peer-to-peer connection. Upon connecting a user application to a wearable device, the wearable device may send over all information associated with the wearable device in two 20-byte long packets to populate the graphical interface on the smartphone representing the current state of the device.

The two packets of information sent is structured as follows:

| Packet 1 | | | | | |
|---|---|---|---|---|---|
| Byte # | 1 | 2 | 3 | 4 | 5 |
| Description | Parameters Indicator | Brightness | Length | Display Mode | Speed |
| Example | 'p' | 0x03 | 0x00 | 0x01 | 0x02 |
| Byte # | 6 | 7 | 8 | 9 | 10 |
| Description | Random | Advertise | Color(1) | Color(2) | Color(3) |
| Example | 0x00 | 0x01 | 0x0F | 0x0F | 0x00 |
| Byte # | 11 | 12 | 13 | 14 | 15-20 |
| Description | Color(4) | Color(5) | Color(6) | Threshold | Misc. |
| Example | 0x00 | 0x0F | 0x0F | 0x04 | {0x00, 0x00, . . . } |

| Packet 2 | |
|---|---|
| Byte # | 1 | 2-20 |
| Description | Elements Indicator | Response 1-Response 19 |
| Example | 'e' | {0x05, 0x03, 0x11, . . . } |

Once a closed peer-to-peer connection has been established, the user can change these attributes on the wearable device in real time by means of the user application. Additionally, wearable device the user application, the user can display the color assigned to identify their wearable device, change the device name and the matching responses threshold. To ensure that the user can observe the changes they are making, communications with other wearable devices and the coordinator may be disabled for the duration of the connection and may be resumed upon the disconnection from the user application, unless the user has opted to disable the intent to advertise function.

For communications between the coordinator application and the wearable devices may be accomplished as follows. The coordinator, using a smartphone (or other mobile device) with a coordinator application installed, broadcasts a 31-byte advertising packet that is prefixed with identifying information used by nearby wearable devices to ensure the data is sent by a credible coordinator source. This data may be followed by an event ID that must be identical to the event ID stored on wearable devices for them to react to the following commands. The next byte of data determines whether wearable devices should currently be operating in their normal modes or reacting to commands from the coordinator. Byte 9 controls the brightness. Byte 10 determines whether the wearable devices should display a blinking or solid 6-byte color chosen by the coordinator located in bytes 12-17 or show a color that represents the wearer's response to the question number following in byte 11.

| Byte # | 1-4 | 5 | 6 | 7 | 8 |
|---|---|---|---|---|---|
| Description | Misc. | System ID | Master ID | Event ID | Master Mode (ON/OFF) |
| Example | {0x00, 0x00, ...} | 0x44 | 'M' | 0x09 | {0x00, 0x01} |

| Byte # | 10 | 11 | 12 | 13 |
|---|---|---|---|---|
| Description | Color Mode = 0 × 00 | Blink/Solid | Color (1) | Color (2) |
| Example | 0 × 00 | {0 × 00, 0 × 01 } | 0 × 00 | 0 × 00 |

| Byte # | 9 |
|---|---|
| Description | Brightness |
| Example | 0 × 05 |

| Byte # | 10 | 11 | 12-31 |
|---|---|---|---|
| Description | Response Mode = 0 × 01 | Question # | Misc. |
| Example | 0 × 01 | 0 × 08 | {0 × 00, 0 × 00, ....} |

| Byte # | 14 | 15 | 16 | 17 | 18-31 |
|---|---|---|---|---|---|
| Description | Color(3) | Color(4) | Color(5) | Color(6) | Misc. |
| Example | 0x0F | 0x0F | 0x0F | 0x0F | {0x00, 0x00, ...} |

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A system for operating wearable electronic devices, the system comprising:
   a plurality of wearable electronic devices, each wearable electronic device comprising: a plurality of light emitters, an electronic wearable device processor communicatively coupled to the plurality of light emitters, a radio frequency transceiver communicatively coupled to the electronic wearable device processor, and electronic persistent memory communicatively coupled to the electronic wearable device processor; and
   user mobile device non-transitory computer readable media comprising instructions that, when executed by at least one electronic processor of a respective user mobile device, cause the respective user mobile device to perform operations comprising:
      establishing a wireless communication channel with a respective electronic wearable device using a respective radio frequency transceiver of the respective electronic wearable device;
      receiving, from a respective user of the respective electronic wearable device, a respective identification of the respective electronic wearable device;
      receiving, from the respective user, an identification of an event;
      passing the identification of the event to the respective electronic wearable device, wherein the respective electronic wearable device stores the event identification in respective electronic persistent memory;
      retrieving, by the user mobile device, at least one information request associated with the event;
      displaying, to the respective user, the at least one information request associated with the event;
      receiving response data, from the respective user, responsive to the at least one information request; and
      passing the response data to the respective electronic wearable device, wherein the respective electronic wearable device stores the response data in respective persistent memory;
   wherein a respective electronic wearable device processor of the respective electronic wearable device is configured to perform operations comprising:

detecting a proximity of a second electronic wearable device;
interrogating the second electronic wearable device for event data;
determining that the event data matches the event identification;
interrogating the second electronic wearable device for second electronic wearable device response data;
retrieving the response data from respective persistent memory;
determining that a number of matches between the response data and the second electronic wearable device response data exceeds a threshold; and
in response to the determining that a number of matches between the response data and the second electronic wearable device response data exceeds a threshold, causing a respective plurality of light emitters of the respective electronic wearable device to perform a match display.

2. The system of claim 1, wherein each of the wearable electronic devices lacks an audio sensor.

3. The system of claim 1, wherein each wearable electronic device comprises a bracelet.

4. The system of claim 1, further comprising coordinator mobile device non-transitory computer readable media comprising instructions that, when executed by at least one electronic processor of a coordinator mobile device, cause the coordinator mobile device to perform operations comprising:
broadcasting an advertising message comprising the identification of the event to the plurality of electronic wearable devices; and
sending a coordinator-initiated command to the plurality of electronic wearable devices, wherein electronic wearable devices of the plurality of electronic wearable devices that store the event identification in respective electronic persistent memory execute the command.

5. The system of claim 4, wherein the command comprises an instruction to display a particular pattern on the plurality of light emitters of the plurality of electronic wearable devices that store the event identification in respective electronic persistent memory.

6. The system of claim 4, wherein the command comprises an instruction to display a particular pattern on the plurality of light emitters of the plurality of electronic wearable devices that store both the event identification and a particular set of response data in respective electronic persistent memory.

7. The system of claim 1, further comprising a non-wearable object comprising:
a plurality of non-wearable device light emitters;
an electronic non-wearable device processor communicatively coupled to the plurality of light emitters;
a radio frequency transceiver communicatively coupled to the electronic non-wearable device processor; and
electronic persistent memory communicatively coupled to the electronic non-wearable device processor;
wherein the non-wearable device is configured to display a particular proximity pattern on the plurality of non-wearable device light emitters when in proximity to a wearable electronic device of the plurality of wearable electronic devices.

8. The system of claim 1, wherein the respective electronic wearable device processor of the respective electronic wearable device is further configured to perform operations comprising:

displaying a pattern particular to the respective electronic wearable device on the respective plurality of light emitters; and
displaying the match display concurrently with the pattern particular to the respective electronic wearable device on the respective plurality of light emitters of the respective electronic wearable device.

9. The system of claim 1, further comprising:
a remote database communicatively coupled to the internet; and
coordinator mobile device non-transitory computer readable media comprising instructions that, when executed by at least one electronic processor of a coordinator mobile device, cause the coordinator mobile device to perform operations comprising:
receiving the at least one information request associated with the event from a coordinator; and
forwarding the at least one information request associated with the event for storage in the remote database;
wherein the retrieving, by the user mobile device, the at least one information request associated with the event comprises retrieving the at least one information request associated with the event from the remote database.

10. The system of claim 1, wherein the user mobile device non-transitory computer readable media further comprises instructions that, when executed by at least one electronic processor of a respective user mobile device, cause the respective user mobile device to perform further operations comprising:
detecting a coordinator mobile device advertising message comprising the identification of the event; and
displaying the identification of the event in a user interface of the respective user mobile device;
wherein the receiving, from the respective user, an identification of an event comprises receiving a selection of the identification of the event through the user interface.

11. A method of operating wearable electronic devices, the method comprising:
providing a plurality of wearable electronic devices, each wearable electronic device comprising: a plurality of light emitters, an electronic wearable device processor communicatively coupled to the plurality of light emitters, a radio frequency transceiver communicatively coupled to the electronic wearable device processor, and electronic persistent memory communicatively coupled to the electronic wearable device processor;
establishing, by a respective user mobile device, a wireless communication channel with a respective electronic wearable device using a respective radio frequency transceiver of the respective electronic wearable device;
receiving, by the respective user mobile device, and from a respective user of the respective electronic wearable device, a respective identification of the respective electronic wearable device;
receiving, by the respective user mobile device, and from the respective user, an identification of an event;
passing, by the respective user mobile device, the identification of the event to the respective electronic wearable device, wherein the respective electronic wearable device stores the event identification in respective electronic persistent memory;
retrieving, by the respective user mobile device, at least one information request associated with the event;

displaying, by the respective user mobile device, and to the respective user, the at least one information request associated with the event;

receiving, by the respective user mobile device and from the respective user, response data responsive to the at least one information request;

passing, by the respective user mobile device, the response data to the respective electronic wearable device, wherein the respective electronic wearable device stores the response data in respective persistent memory;

detecting, by the respective electronic wearable device, a proximity of a second electronic wearable device;

interrogating, by the respective electronic wearable device, the second electronic wearable device for event data;

determining, by the respective electronic wearable device, that the event data matches the event identification;

interrogating, by the respective electronic wearable device, the second electronic wearable device for second electronic wearable device response data;

retrieving, by the respective electronic wearable device, the response data from respective persistent memory;

determining, by the respective electronic wearable device, that a number of matches between the response data and the second electronic wearable device response data exceeds a threshold; and by the respective electronic wearable device, and in response to the determining that a number of matches between the response data and the second electronic wearable device response data exceeds a threshold, causing a respective plurality of light emitters of the respective electronic wearable device to perform a match display.

12. The method of claim 11, wherein each of the wearable electronic devices lacks an audio sensor.

13. The method of claim 11, wherein each wearable electronic device comprises a bracelet.

14. The method of claim 11, further comprising providing coordinator mobile device non-transitory computer readable media comprising instructions that, when executed by at least one electronic processor of a coordinator mobile device, cause the coordinator mobile device to perform operations comprising:

broadcasting an advertising message comprising the identification of the event to the plurality of electronic wearable devices; and sending a coordinator-initiated command to the plurality of electronic wearable devices, wherein electronic wearable devices of the plurality of electronic wearable devices that store the event identification in respective electronic persistent memory execute the command.

15. The method of claim 14, wherein the command comprises an instruction to display a particular pattern on the plurality of light emitters of the plurality of electronic wearable devices that store the event identification in respective electronic persistent memory.

16. The method of claim 14, wherein the command comprises an instruction to display a particular pattern on the plurality of light emitters of the plurality of electronic wearable devices that store both the event identification and a particular set of response data in respective electronic persistent memory.

17. The method of claim 11, further comprising:

providing a non-wearable object comprising: a plurality of non-wearable device light emitters, an electronic non-wearable device processor communicatively coupled to the plurality of light emitters, a radio frequency transceiver communicatively coupled to the electronic non-wearable device processor, and electronic persistent memory communicatively coupled to the electronic non-wearable device processor;

wherein the non-wearable device is configured to display a particular proximity pattern on the plurality of non-wearable device light emitters when in proximity to a wearable electronic device of the plurality of wearable electronic devices.

18. The method of claim 11, wherein the respective electronic wearable device processor of the respective electronic wearable device is further configured to perform operations comprising:

displaying a pattern particular to the respective electronic wearable device on the respective plurality of light emitters; and displaying the match display concurrently with the pattern particular to the respective electronic wearable device on the respective plurality of light emitters of the respective electronic wearable device.

19. The method of claim 11, further comprising:

receiving, by a coordinator mobile device, the at least one information request associated with the event from a coordinator; and forwarding, by a coordinator mobile device, the at least one information request associated with the event for storage in the remote database;

wherein the retrieving, by the user mobile device, the at least one information request associated with the event comprises retrieving the at least one information request associated with the event from a remote database communicatively coupled to the internet.

20. The method of claim 11, further comprising:

detecting, by the respective user mobile device, a coordinator mobile device advertising message comprising the identification of the event; and displaying the identification of the event in a user interface of the respective user mobile device;

wherein the receiving, by the respective user mobile device, and from the respective user, an identification of an event comprises receiving a selection of the identification of the event through the user interface.

\* \* \* \* \*

UNITED STATES PATENT AND TRADEMARK OFFICE
CERTIFICATE OF CORRECTION

| | |
|---|---|
| PATENT NO. | : 11,452,193 B2 |
| APPLICATION NO. | : 17/270284 |
| DATED | : September 20, 2022 |
| INVENTOR(S) | : John Michael Rattray |

It is certified that error appears in the above-identified patent and that said Letters Patent is hereby corrected as shown below:

On the Title Page

Item (22), PCT Filed: "Sep. 23, 2019" should be --Aug. 23, 2019--

Signed and Sealed this
Eighteenth Day of October, 2022

Katherine Kelly Vidal
*Director of the United States Patent and Trademark Office*